BEST AVAILABLE COPY 4,798

UNITED STATES PATENT OFFICE.

EDELMAR DE HAYS SAINT CYR, OF LOWELL, MASSACHUSETTS.

IMPROVEMENT IN MEDICAL COMPOUNDS OR COFFEE ANTIDOTES.

Specification forming part of Letters Patent No. 121,665, dated December 5, 1871; reissue No. 4,798, dated March 12, 1872.

*To all to whom these presents shall come:*

Be it known that I, EDELMAR DE HAYS SAINT CYR, of Lowell, in the county of Middlesex and State of Massachusetts, have invented a certain new and useful Improved Medical Compound or Liquid; and that the following is a full and exact description of the same.

This medical compound is both for a therapeutic and a preventive agent in cases of miasmatic poisonings, epidemic, and putrid diseases, such as cholera, yellow fever, intermittent fever, the various typhoid malignant affections, hospital putrefaction, mortification, &c.

The compound is composed of the ingredients mixed together in or about the proportions as follows: Hyposulphite of soda, eighty (80) grains; chloride of sodium, eighty (80) grains; nitrate of potassa, forty (40) grains; carbolic acid, (extra pure,) eight (8) grains; compound tincture of iodide of sulphur, (produced as will be hereinafter stated,) eighty (80) minims; glycerine, (by preference, Price's, so known,) one (1) ounce; sugar sirup, fourteen (14) ounces, fermented by any of the well-known processes of fermentation. This compound is then distilled by any of the well-known processes of distillation. Condense the vapors resulting therefrom, which completes the process and manufacture. For a flavor, an extract of coffee, or other flavoring extract or material, may be employed, but coffee is preferable, and it is what I intend more particularly to use. However, it is not absolutely necessary to use a flavoring extract, but it is preferable. The sugar-sirup produces alcohol in the distillation of the compound, and it acts as a sweetening and preservative. In lieu of sugar-sirup others may be used, and in lieu of sugar other substances may be employed, to produce in the distillation of the compound an alcoholic spirit, but sugar is preferable; and it is best in the distillation of the compound that a material should be with it when distilled that will produce an alcoholic spirit, as thus a better chemical combination of the vapors evolved from the compound is secured. For the production of the compound of tincture of iodide of sulphur used in the composition above described the following ingredients are employed—viz: Pulverized iodine, one (1) ounce; iodide of potassium, two (2) ounces; sublimed sulphur, two and a half ($2\frac{1}{2}$) drachms; rectified alcohol, forty (40) ounces. These several ingredients just above named are allowed to stand or steep for fourteen days, when, filtering the tincture, it is ready for use.

In the use of my improved liquid compound above described, what I intend to denominate a coffee antidote, as a preventive or a therapeutic a tablespoonful two or three times a day is sufficient; and, to render it agreeable to the taste, it may be mixed with warm water sweetened with sugar. The most important property of this compound or coffee antidote is the effect which it produces on some of the phenomena of catalysis, of fermentation, and of putrefaction. It neutralizes the virus, the miasma, and other poisons which fill the atmosphere. It destroys all microscopic animalcules, is a powerful antiseptic against purulent infection, which it prevents, or putrid fermentation, which it stops. It manifests that property on the solids as well as on the humors of animal organism in the presence of air. It combines chemically with animal matters (flesh, blood, albumen, &c.,) without sensibly altering their forms. It renders fluid animal liquids, blood especially. It prevents purulent infection by stopping the absorption of putrid matters, and acts directly and instantaneously not only on the sick tissues, but on the humors themselves, combining chemically with the humors. It prevents the injurious effect of the air on the lungs, and destroys the putrid principle, as it were on the spot.

Having thus described my invention, I shall state my claim as follows:

The coffee antidote or medical compound, composed of ingredients or their equivalents, mixed together in or about the proportions and made substantially as described, for the purpose specified.

Witnesses: DR. E. D. SAINT CYR.
ALBERT W. BROWN,
JOHN P. MCELROY.